(12) United States Patent
Liu et al.

(10) Patent No.: US 11,305,839 B2
(45) Date of Patent: Apr. 19, 2022

(54) TRANSMISSION DEVICE FOR BICYCLE

(71) Applicants: Wen-Kuei Liu, Taichung (TW);
Chao-Hsuan Liu, Taichung (TW);
Yu-Chun Liu, Taichung (TW); Yi-Shan Liu, Taichung (TW)

(72) Inventors: Wen-Kuei Liu, Taichung (TW);
Chao-Hsuan Liu, Taichung (TW);
Yu-Chun Liu, Taichung (TW); Yi-Shan Liu, Taichung (TW)

(*) Notice: Subject to any disclaimer, the term of this patent is extended or adjusted under 35 U.S.C. 154(b) by 417 days.

(21) Appl. No.: 16/529,219

(22) Filed: Aug. 1, 2019

(65) Prior Publication Data
US 2021/0031880 A1    Feb. 4, 2021

(51) Int. Cl.
*B62M 11/06* (2006.01)
*B62M 9/124* (2010.01)
*B62M 25/04* (2006.01)

(52) U.S. Cl.
CPC ............ *B62M 11/06* (2013.01); *B62M 9/124* (2013.01); *B62M 25/04* (2013.01); *B60Y 2200/13* (2013.01)

(58) Field of Classification Search
CPC .. B62M 9/124; B62M 9/1248; B62M 9/1348; B62M 9/134; B62M 11/04; B62M 11/06; B62M 11/08; B62M 25/045

USPC .......................................................... 280/238
See application file for complete search history.

(56) References Cited

U.S. PATENT DOCUMENTS

| 8,302,508 B2 * | 11/2012 | Chen ...................... B62M 11/06 74/810.1 |
| 8,869,652 B2 * | 10/2014 | Liao ......................... B62M 6/55 74/665 R |
| 10,392,077 B2 * | 8/2019 | Wu .......................... F16D 41/36 |

FOREIGN PATENT DOCUMENTS

KR      20180065679 A   *  6/2018

* cited by examiner

*Primary Examiner* — Kevin Hurley
*Assistant Examiner* — Hosam Shabara
(74) *Attorney, Agent, or Firm* — Muncy, Geissler, Olds & Lowe, PC (57) ABSTRACT

A transmission device for a bicycle includes a housing, a mandrel, an assembling member, a transmission assembly, a derailleur assembly and a clutch assembly. The mandrel is rotatably disposed on the housing and extends along an axial direction. The assembling member has a driving gear. The transmission assembly is rotatably disposed on the housing and engaged with the driving gear. The derailleur assembly includes a first derailleur gear and a second derailleur gear. The transmission assembly is engaged with the first derailleur gear and the second derailleur gear. The clutch assembly includes a clutch member.

9 Claims, 7 Drawing Sheets

TRANSMISSION DEVICE FOR BICYCLE

BACKGROUND OF THE INVENTION

Field of the Invention

The present invention relates to a transmission device for a bicycle.

Description of the Prior Art

Generally, a conventional transmission device for a bicycle includes a plurality of front sprockets, a plurality of rear sprockets and a chain engaged with one of the plurality of front sprockets and one of the plurality of rear sprockets. The chain is adjustable by a front or rear derailleur so as to derail to another sprocket for various riding requirements. For example, if a number of the plurality of front sprockets is three and a number of the plurality of rear sprockets is six, the transmission device has 18 speeds. However, the number of the plurality of front or rear sprockets has to be increased to provide more multi-speed, which increases a whole thickness of the plurality of front or rear sprockets and results in inconvenience for riding. In addition, the front or rear derailleur can be inaccurately derailed to another one of the plurality of front or rear sprockets due to too many front or rear sprockets.

The present invention is, therefore, arisen to obviate or at least mitigate the above-mentioned disadvantages.

SUMMARY OF THE INVENTION

The main object of the present invention is to provide a transmission device for a bicycle which has multi-speed without a large sprocket thickness and is convenient to use.

To achieve the above and other objects, the present invention provides a transmission device for a bicycle, including a housing, a mandrel, an assembling member, a transmission assembly, a derailleur assembly and a clutch assembly. The housing is configured to be disposed on the bicycle. The mandrel is rotatably disposed on the housing and extends along an axial direction. Each of two axially opposite sides of the mandrel is configured to be assembled with a crank of the bicycle. The assembling member is configured to be assembled with a sprocket of the bicycle, and the assembling member has a driving gear co-movably disposed thereon. The transmission assembly is rotatably disposed on the housing and engaged with the driving gear. The derailleur assembly includes a first derailleur gear and a second derailleur gear which are rotatable relative to the housing. The first derailleur gear and the second derailleur gear are respectively engaged with the transmission assembly. The clutch assembly includes a clutch member which is co-movably assembled with the mandrel and movable between a first position and a second position along the axial direction. When the clutch member is in the first position, the clutch member is engaged with the first derailleur gear and disengaged from the second derailleur gear, and the mandrel drives the first derailleur gear, the transmission assembly and the driving gear to rotate; when the clutch member is in the second position, the clutch member is engaged with the second derailleur gear and disengaged from the first derailleur gear, and the mandrel drives the second derailleur gear, the transmission assembly and the driving gear to rotate.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
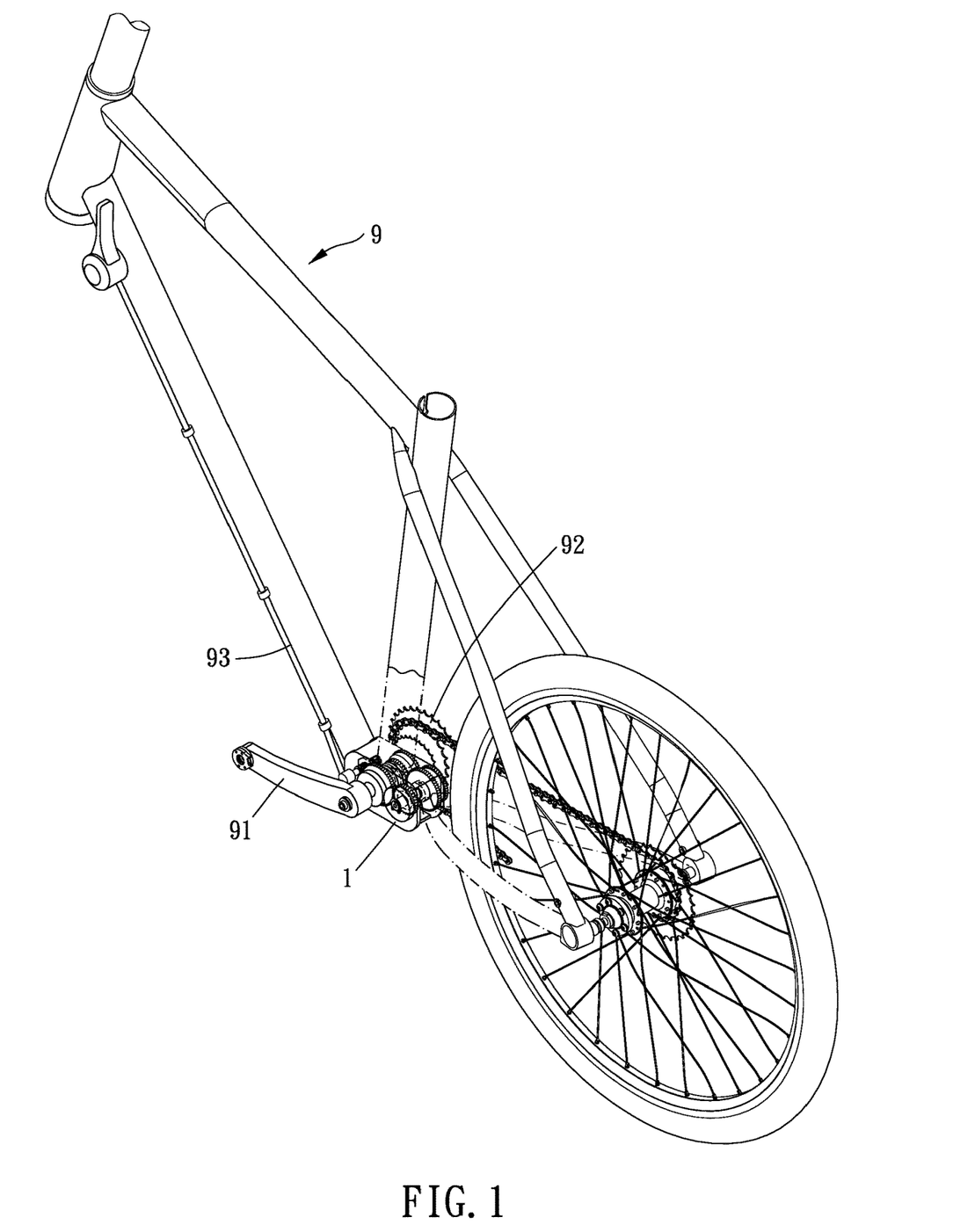
FIG. 1 is a schematic diagram of a preferable embodiment of the present invention in use.
Figure 2:
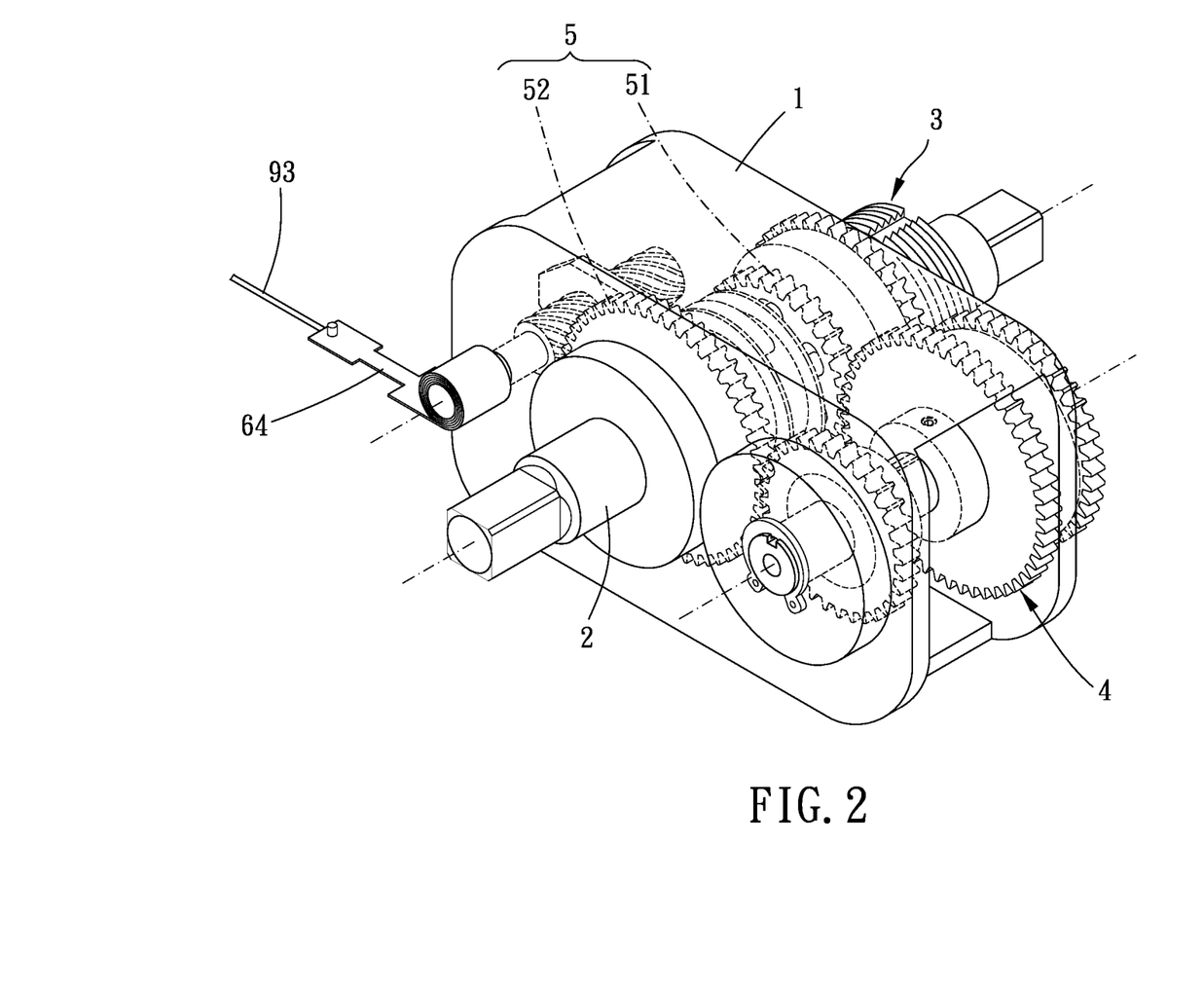
FIG. 2 is a stereogram of a preferable embodiment of the present invention.
Figure 3:
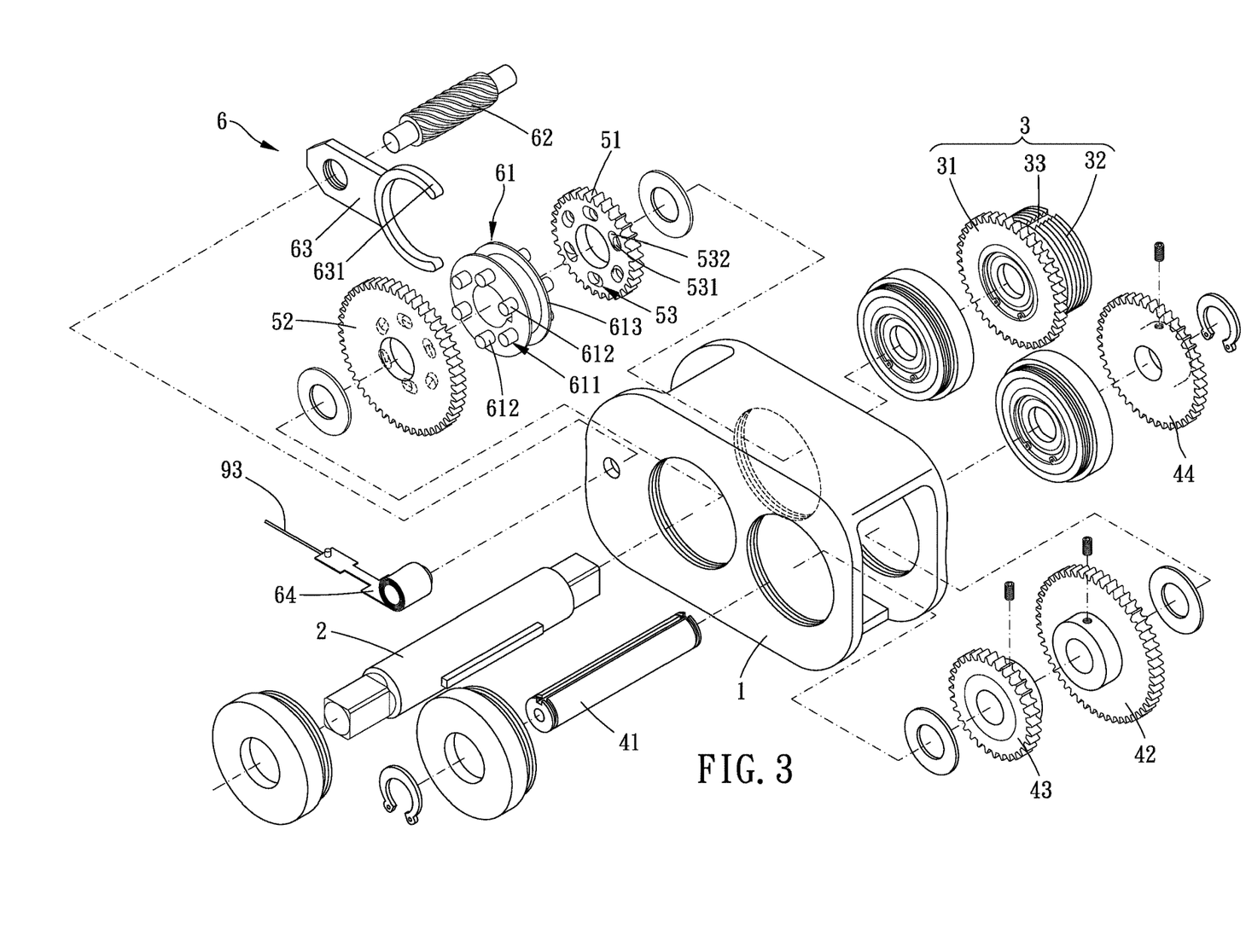
FIG. 3 is a breakdown drawing of a preferable embodiment of the present invention.
Figure 4:
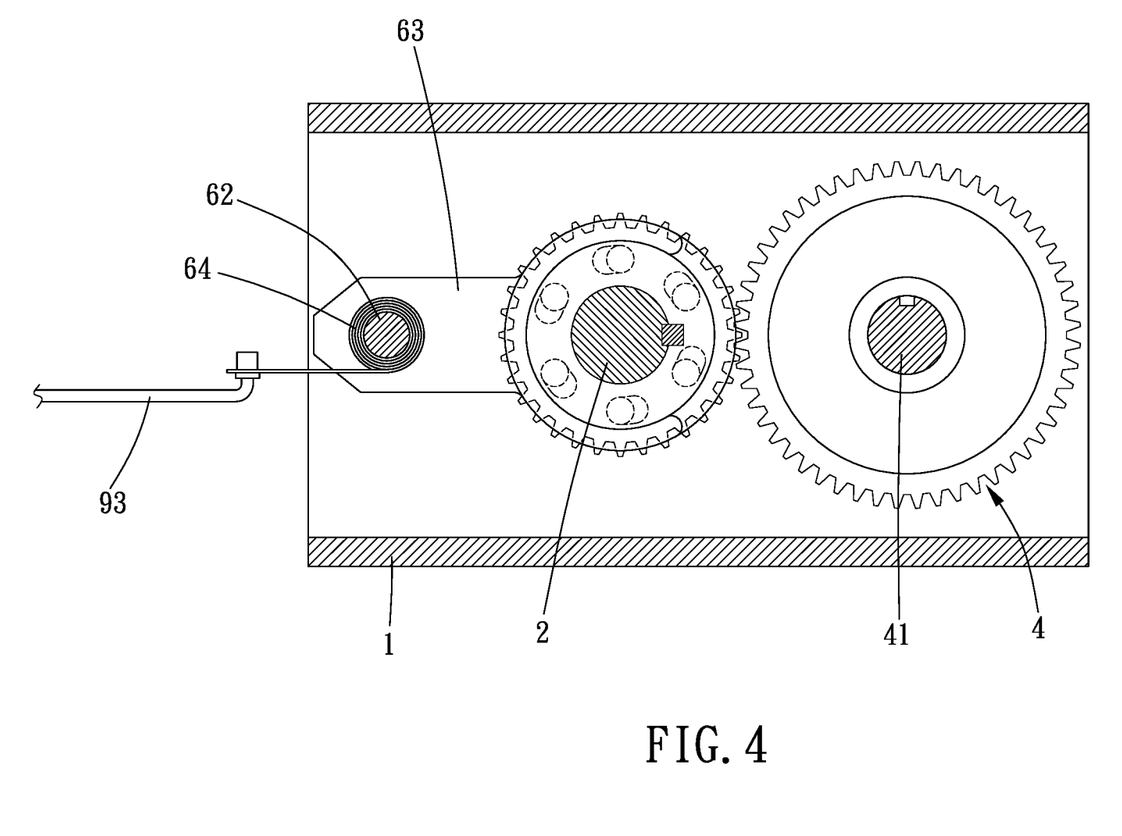
FIG. 4 is a cross-sectional view of a preferable embodiment of the present invention.
Figure 5:
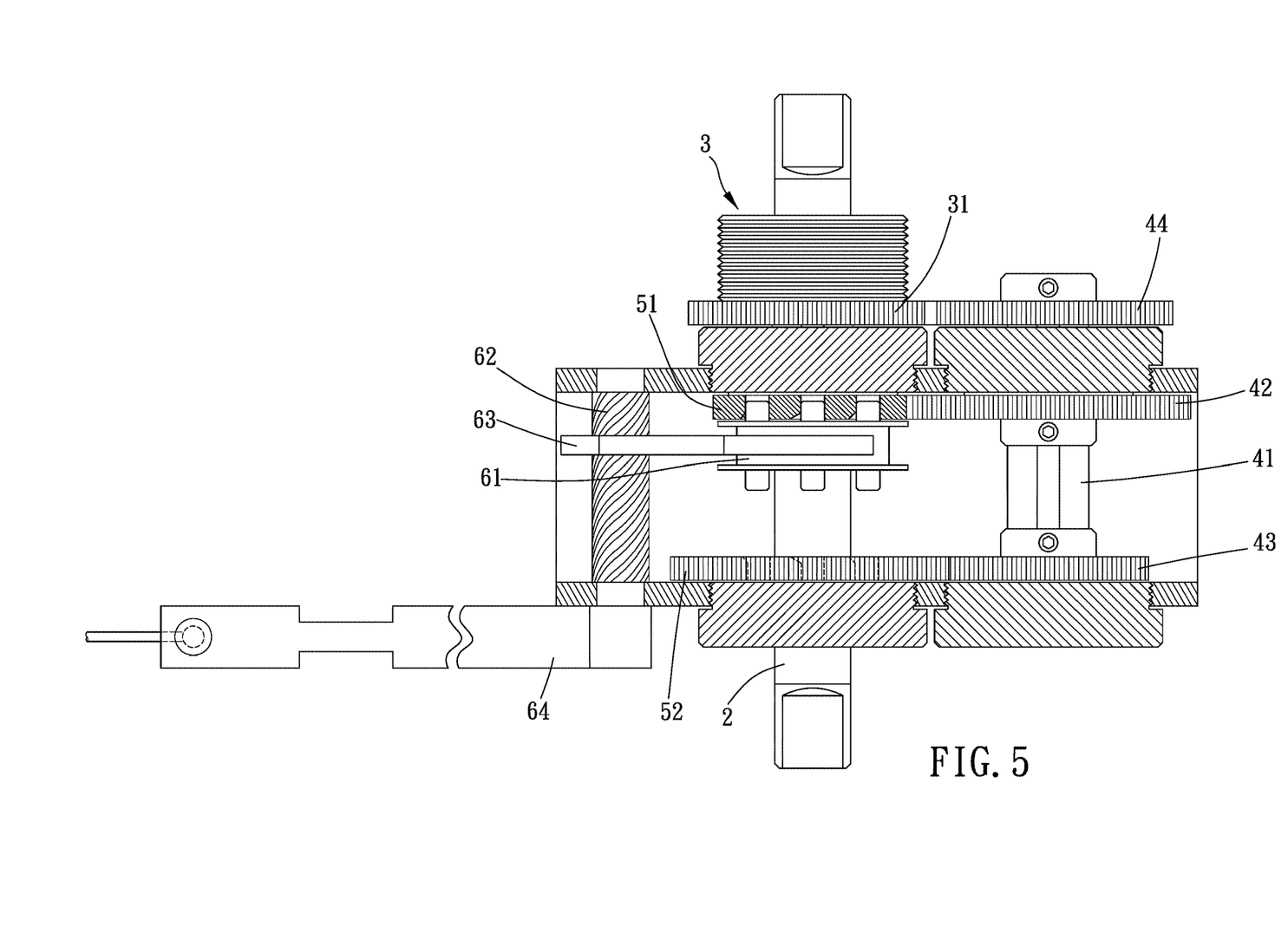
FIGS. 5 to 7 are schematic diagrams of a preferable embodiment of the present invention in operation.
Figure 6:
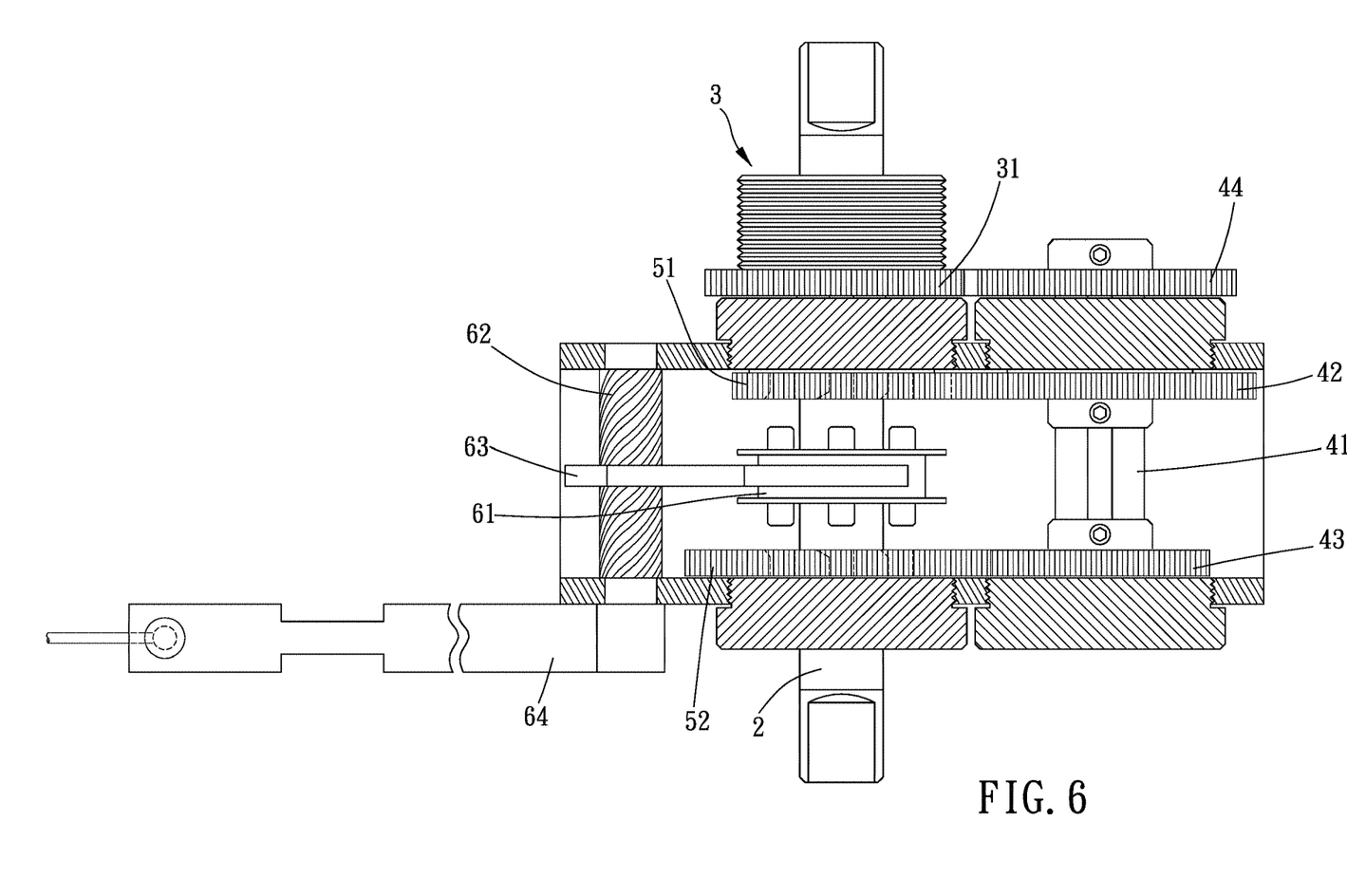
Figure 7:
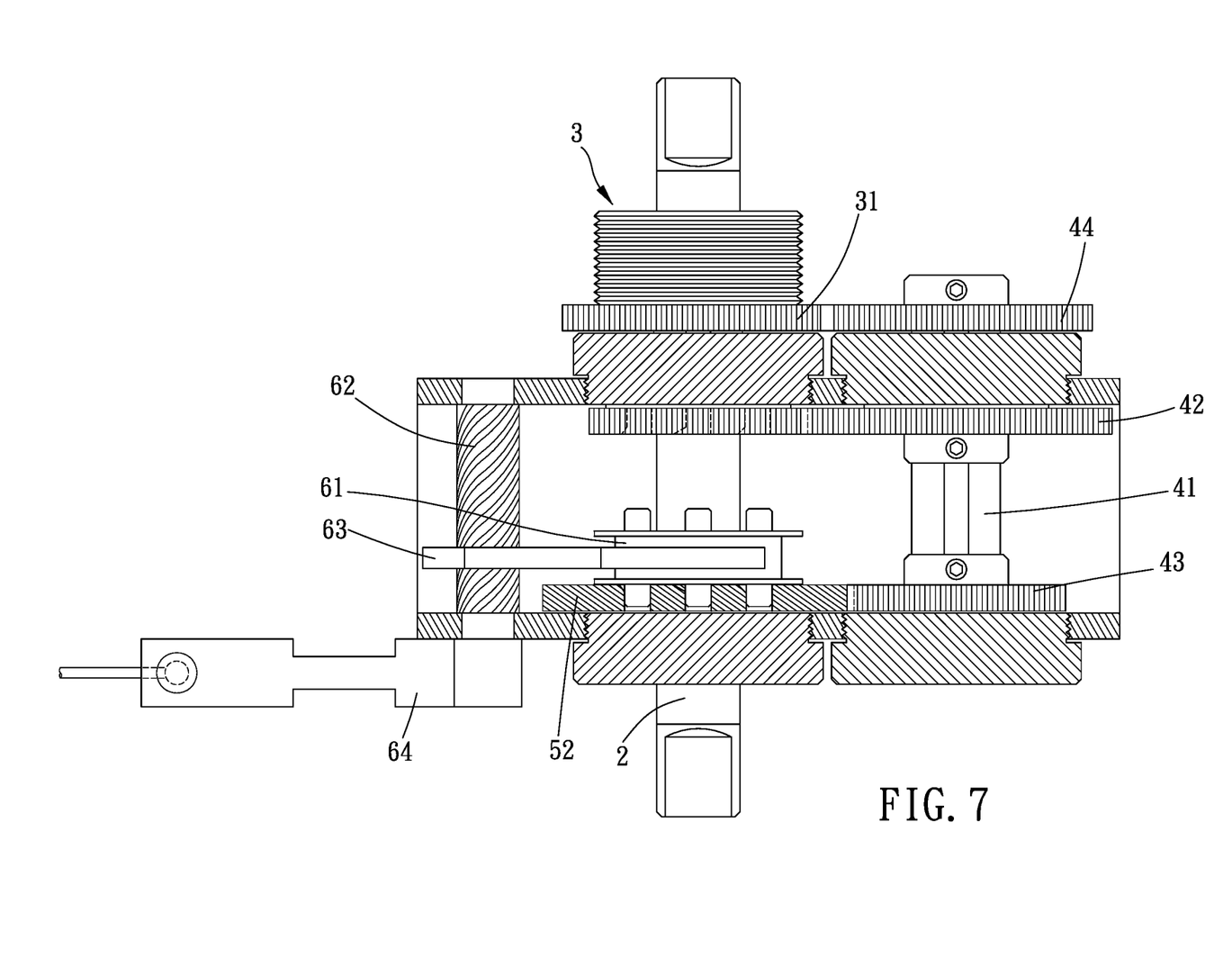

Please refer to FIGS. 1 to 7 for a preferable embodiment of the present invention. A transmission device for a bicycle 9 of the present invention includes a housing 1, a mandrel 2, an assembling member 3, a transmission assembly 4, a derailleur assembly 5 and a clutch assembly 6.

The housing 1 is configured to be disposed on the bicycle 9. In this embodiment, the housing 1 is connected to a seat tube, a down tube and two chain stays of the bicycle 9; that is, the housing 1 is mounted to a bottom bracket of the bicycle 9.

The mandrel 2 is rotatably disposed on the housing 1 and extends along an axial direction. Each of two axially opposite sides of the mandrel 2 is configured to be assembled with a crank 91 of the bicycle 9 so that the mandrel 2 is driven to rotate when pedals connected with the cranks 91 are pedaled.

The assembling member 3 is configured to be assembled with a sprocket 92 of the bicycle 9. The assembling member 3 has a driving gear 31 co-movably disposed thereon. In this embodiment, an outer periphery wall of the assembling member 3 has an outer threaded portion 32 and a key slot 33 extending axially. The key slot 33 is configured to receive a key body, and the outer threaded portion 32 is configured to be screwed with the sprocket 92 which is engaged with the key body so as to mount the sprocket 92 to the assembling member 3.

The transmission assembly 4 is rotatably disposed on the housing 1 and engaged with the driving gear 31.

The derailleur assembly 5 includes a first derailleur gear 51 and a second derailleur gear 52 which are rotatable relative to the housing 1. The first derailleur gear 51 and the second derailleur gear 52 are respectively engaged with the transmission assembly 4. A radial dimension of the first derailleur gear 51 is different from a radial dimension of the second derailleur gear 52. In this embodiment, the radial dimension of the first derailleur gear 51 is smaller than the radial dimension of the second derailleur gear 52 so that the first derailleur gear 51 has labor-saving effect and the second derailleur gear 52 has time-saving effect.

The clutch assembly 6 includes a clutch member 61 which is co-movably assembled with the mandrel 2 and movable between a first position and a second position along the axial direction.

When the clutch member 61 is in the first position, the clutch member 61 is engaged with the first derailleur gear 51 and disengaged from the second derailleur gear 52, and the mandrel 2 drives the first derailleur gear 51, the transmission assembly 4 and the driving gear 31 to rotate so as to provide labor-saving effect when the pedals connected with the cranks 91 are pedaled for starting or climbing. When the clutch member 61 is in the second position, the clutch member 61 is engaged with the second derailleur gear 52 and disengaged from the first derailleur gear 51, and the mandrel 2 drives the second derailleur gear 52, the transmission assembly 4 and the driving gear 31 to rotate so as to provide time-saving effect when the pedals connected with the cranks 91 are pedaled for high speed riding. Therefore, a conventional bicycle with 18-speed can be increased to 36-speed by cooperating with the transmission device of the present invention, which greatly increases adjustable speeds without a large thickness of the sprocket 92 and is convenient to use.

Specifically, the clutch member 61 is non-rotatably sleeved to the mandrel 2 and movable between the first position and the second position in the axial direction relative to the mandrel 2. The first derailleur gear 51 and the second derailleur gear 52 are rotatably sleeved to the mandrel 2 and located at two opposite sides of the clutch member 61.

Preferably, two axially opposite sides of the clutch member 61 each include a first engaging portion 611, and the first derailleur gear 51 and the second derailleur gear 52 each include a second engaging portion 53 which faces toward the clutch member 61 and is engageable with one of the first engaging portion 611 so that the clutch member 61 is rotatable together with the first derailleur gear 51 or the second derailleur gear 52. In this embodiment, one of the first engaging portion 611 and the second engaging portion 53 which are engageable with each other includes a plurality of protruding portions 612 extending axially and the other includes a plurality of recessions 531, and each of the plurality of protruding portions 612 is insertable into one of the plurality of recessions 531. In this embodiment, the first engaging portion 611 includes the plurality of protruding portions 612, and the second engaging portion 53 includes the plurality of recessions 531 each having a guiding surface 532 which is circumferentially inclined so that the plurality of protruding portions 612 can be smoothly inserted into the plurality of recessions 531 when the clutch member 61 is rotating.

Moreover, the clutch assembly 6 further includes a screw 62 and an actuating member 63. The screw 62 is rotatably disposed on the housing 1 and extends axially. An end of the actuating member 63 is screwed to the screw 62, and another end of the actuating member 63 is engaged with the clutch member 61 so as to drive the clutch member 61 to move axially. In this embodiment, an end of the screw 62 has a flat coil spring 64 sleeved thereon, and an end of the flat coil spring 64 is configured to be connected with a cable 93. The flat coil spring 64 twistedly biases the screw 62 so that the actuating member 63 has a tendency to move the clutch member 61 toward the first position. An end of the cable 93 is connected to a lever disposed on the down tube of the bicycle 9, and the flat coil spring 64 is configured to be driven to move by pulling the lever.

Preferably, the clutch member 61 has two annular flanges 613 extending radially. An end of the actuating member 63 away from the screw 62 has a sleeving member 631 which is C-shaped, and the sleeving member 631 is sleeved to an outer periphery wall of the clutch member 61 and engaged between the two annular flanges 613 so that the actuating member 63 can drive the clutch member 61 to move axially without interfering with rotation of the clutch member 61.

The transmission assembly 4 includes a transmission shaft 41, a first transmission gear 42 and a second transmission gear 43. The transmission shaft 41 is rotatably disposed on the housing 1, and the first transmission gear 42 and the second transmission gear 43 are non-rotatably sleeved to the transmission shaft 41. The first transmission gear 42 is engaged with the first derailleur gear 51, and the second transmission gear 43 is engaged with the second derailleur gear 52. In this embodiment, the transmission assembly 4 further includes a third transmission gear 44. The third transmission gear 44 is non-rotatably sleeved to the transmission shaft 41 and located out of the housing 1. The assembling member 3 is rotatably sleeved to the mandrel 2 and located out of the housing 1, and the third transmission gear 44 is engaged with the driving gear 31. Therefore, the clutch member 61 can drive the transmission shaft 41 to rotate no matter the clutch member 61 is engaged with the first derailleur gear 51 or the second derailleur gear 52, the third transmission gear 44 of the transmission shaft 41 drives the driving gear 31 to rotate, and then the assembling member 3 drives the sprocket 92 to rotate.

In summary, the transmission device for bicycle greatly increases adjustable speeds of the bicycle without the large thickness of the sprocket and is convenient to use.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A transmission device for a bicycle, including:
a housing, configured to be disposed on the bicycle;
a mandrel, rotatably disposed on the housing and extending along an axial direction, each of two axially opposite ends of the mandrel being configured to be assembled with a crank of the bicycle;
an assembling member, configured to be assembled with a sprocket of the bicycle, the assembling member having a driving gear co-movably disposed thereon;
a transmission assembly, rotatably disposed on the housing and engaged with the driving gear;
a derailleur assembly, including a first derailleur gear and a second derailleur gear which are rotatable relative to the housing, the first derailleur gear and the second derailleur gear being respectively engaged with the transmission assembly;
a clutch assembly, including a clutch member which is co-movably assembled with the mandrel and movable between a first position and a second position along the axial direction;
wherein when the clutch member is in the first position, the clutch member is engaged with the first derailleur gear and disengaged from the second derailleur gear, and the mandrel drives the first derailleur gear, the transmission assembly and the driving gear to rotate; when the clutch member is in the second position, the clutch member is engaged with the second derailleur gear and disengaged from the first derailleur gear, the mandrel drives the second derailleur gear, the transmission assembly and the driving gear to rotate;
wherein the clutch member is non-rotatably sleeved to the mandrel and movable between the first position and the second position in the axial direction relative to the mandrel, and the first derailleur gear and the second derailleur gear are rotatably sleeved to the mandrel and located at two opposite sides of the clutch member.

2. The transmission device of claim 1, wherein two axially opposite sides of the clutch member each include a first engaging portion, and the first derailleur gear and the second derailleur gear each include a second engaging portion which faces the clutch member and is engageable with one of the first engaging portion.

3. The transmission device of claim 2, wherein one of the first engaging portion and the second engaging portion which are engageable with each other includes a plurality of protruding portions extending axially and the other includes a plurality of recessions each having a guiding surface which is circumferentially inclined, and each of the plurality of protruding portions is insertable into one of the plurality of recessions.

4. The transmission device of claim 1, wherein the clutch assembly further includes a screw and an actuating member, the screw is rotatably disposed on the housing and extends axially, an end of the actuating member is screwed to the screw, and another end of the actuating member is engaged with the clutch member so as to drive the clutch member to move axially.

5. The transmission device of claim 4, wherein an end of the screw has a flat coil spring sleeved thereon, an end of the flat coil spring is configured to be connected with a cable, and the flat coil spring twistedly biases the screw so that the actuating member has a tendency to move the clutch member toward the first position.

6. The transmission device of claim 4, wherein the clutch member has two annular flanges extending radially, an end of the actuating member away from the screw has a sleeving member which is C-shaped, and the sleeving member is sleeved to an outer periphery wall of the clutch member and engaged between the two annular flanges.

7. The transmission device of claim 1, wherein the transmission assembly includes a transmission shaft, a first transmission gear and a second transmission gear, the transmission shaft is rotatably disposed on the housing, the first transmission gear and the second transmission gear are non-rotatably sleeved to the transmission shaft, the first transmission gear is engaged with the first derailleur gear, and the second transmission gear is engaged with the second derailleur gear.

8. The transmission device of claim 7, wherein the transmission assembly further includes a third transmission gear, the third transmission gear is non-rotatably sleeved to the transmission shaft and located out of the housing, the assembling member is rotatably sleeved to the mandrel and located out of the housing, and the third transmission gear is engaged with the driving gear.

9. The transmission device of claim 1, wherein an outer periphery wall of the assembling member has an outer threaded portion and a key slot extending axially, the key slot is configured to receive a key body, and the outer threaded portion is configured to be screwed with the sprocket which is engaged with the key body.

* * * * *